Dec. 8, 1970  W. C. DOWNING, JR., ET AL  3,546,565
COMPENSATION OF INPUT DIRECT CURRENT COMPONENT IN
A CURRENT TRANSFORMER
Filed Oct. 29, 1968  2 Sheets-Sheet 1

INVENTORS
WILLIAM C. DOWNING Jr.
BY ROBERT E. KOLL

ATTYS.

$N_c I_c = N_1 I_g$ $N_c I_c > N_1 I_g$

INVENTORS.
WILLIAM C. DOWNING Jr.
BY ROBERT E. KOLL

ATTYS.

United States Patent Office

3,546,565
Patented Dec. 8, 1970

3,546,565
COMPENSATION OF INPUT DIRECT CURRENT COMPONENT IN A CURRENT TRANSFORMER
William C. Downing, Jr., and Robert E. Koll, Springfield, Ill., assignors to Sangamo Electric Company, Springfield, Ill., a corporation of Delaware
Filed Oct. 29, 1968, Ser. No. 771,507
Int. Cl. G05f 1/14
U.S. Cl. 323—6                                       5 Claims

ABSTRACT OF THE DISCLOSURE

A current transformer for use in the measurement of a current supplied to a load having direct current components of appreciable magnitude, comprising primary and secondary windings, an air gap in the magnetic circuit of the transformer, and a compensating circuit including a third winding and a capacitor for cancelling the effect of the linear reluctance of the air gap regardless of the load current, the primary winding and third winding having a number of turns and said capacitor being of a value to provide the relationship $N_c I_c = N_1 I_g$ in which $N_c$ is the number of turns on the compensating winding, $I_c$ is the capacitor current, $N_1$ is the number of turns of the primary winding, and $I_g$ is the exciting current for the gap.

BACKGROUND OF THE INVENTION

In the commercial measurement of electric energy of an alternating current circuit, whenever the magnitude of the measured current exceeds that which can be passed directly through the watthour meter (usually limited to 200 amperes in commercial watthour meters), a current transformer is introduced to reduce the load current, in some fixed and predetermined ratio, to a current value suitable for measurement in the watthour meter. In some installations in which the measurement of current must be made at a voltage which is higher than can be tolerated by the watthour meter (usually of the order of 600 volts above ground), a current transformer may be employed to provide insulation between the line and the current circuit of the meter even though the current value itself may not be excessive.

Ideally a current transformer produces in its secondary circuit a current of the same waveform as, and in phase with, the primary current, but of a magnitude which is inversely proportional to the ratio of secondary to primary turns. The secondary magnetomotive force (ampere-turns) therefore tends at any instant to equal the primary ampere-turns. Practically, however, the primary ampere-turns must exceed the secondary ampere-turns by an amount sufficient to magnetize the transformer core to the extent required to induce the voltage necessary to cause the secondary current to circulate through the burden. This difference between primary and secondary ampere-turns, referred to as the "exciting ampere-turns," results in an error; that is, in failure of the secondary current to be exactly in phase with the primary current, and failure of the magnitudes of primary and secondary currents to be exactly inversely proportional to the primary and secondary turns. Nevertheless, by good design and construction and by the selection of suitable magnetic core material (usually of a high-permeability) the exciting ampere-turns may be so minimized that the resultant error is quite acceptable for commercial metering. An acceptable error in the field may be generally identified as an error in ratio which does not exceed a few tenths of a percent and a phase angle error which does not exceed a few minutes of arc. Where the design parameters are such that the required accuracy cannot be achieved in this simple manner, various other methods well-known in the art have been used to compensate for small errors, in either ratio or phase angle.

Current transformers used with watthour meters, for example, are normally designed for operation on sinusoidal current of some known frequency, such as 60 hertz, and the accuracy rating of such units is based upon operation under such condition. When the nature of the load is such that, although the supply voltage is sinusoidal, the resultant current is symmetrical but non-sinusoidal (as might be the case with a resistance load controlled by silicon controlled rectifiers), only the fundamental component of current reacts with the sinusoidal voltage to produce power or energy. Even in the case where the voltage also contains some harmonics, little error is introduced into a power or energy measurement by the current transformer since the secondary current is of substantially the same wave shape as the primary current and power delivered at harmonic frequencies will be correctly measured to the extent that the wattmeter or watthour meter operated from the current transformer is capable of correctly measuring at harmonic frequencies. It can be seen therefore that even in the case of a distorted current the current transformer will, generally speaking, provide reasonably accurate measurement.

The general condition described above, however, does not hold in cases in which either the primary or secondary current includes an appreciable direct current component. While instances in which direct current of appreciable magnitude occurs in the secondary current are highly improbable, it is possible and normal to experience a substantial direct current component in the primary current. One such example is a circuit, using a current transformer, to supply a half-wave rectified load. In such circuits, the direct current component through the primary winding of the current transformer cannot induce a corresponding, opposing, current in the secondary winding (as does an alternating component of current), and the entire direct current component is therefore available for magnetizing the transformer core. Since current transformers are designed, for the reasons described above, to have cores of low magnetic reluctance (so that the exciting current will be quite small compared to the load current), very little direct current is required to saturate the core. When the core approaches saturation, due to the direct current component, the magnetic reluctance of the core is greatly increased and the accuracy of the transformer, in transforming alternating current, is thereby impaired.

A relatively small direct current component is all that is necessary to seriously affect accuracy. For example, a conventional 200:5 ampere current transformer which meets the 0.3 accuracy requirements as specified in USA Standard Requirements for Instrument Transformers (USAS C57.13) will not meet these requirements if the direct current component of primary current is 3 amperes, or 1.5% of rated current. Or, as an extreme case, where the entire load consists of resistance supplied through half-wave rectification, where the direct current component would be approximately 63% of the effective value of the total primary current, the error might be as great as 65%; that is, the fundamental component of secondary current would only be about one-third of the correct value.

SUMMARY OF THE INVENTION

For the supplier of electric energy, errors of these orders of magnitude could mean substantial reduction in revenue; and, since the application of such loads, either in normal usage, or even deliberately to reduce billing charges, is under control of the purchaser of electric energy, it is questionable to what extent the supplier can restrict or regulate such usage. There is a need, therefore, for a current transformer which is not subject to such errors, and it is an object of the present invention to provide a current transformer which in addition to the usual requirements for commercial current transformers, embodies an arrangement which is operative with direct current components of increased magnitude with an acceptable standard of accuracy.

The object of the invention is achieved by providing a transformer having a core and a primary and a secondary winding, a linear reluctance, such as an air gap, in series with the magnetic circuit of the transformer to limit the saturating effect of the direct current component; and a compensating circuit having a winding and a capacitor adjusted to cancel the adverse effect of the linear reluctance provided by the air gap regardless of the load current or the burden on the transformer, said primary winding and compensating winding having a number of turns and said capacitor being of a value to provide the relationship $N_c I_c = N_1 I_g$ in which $N_c$ is the number of turns on the compensating winding, $I_c$ is the capacitor current, $N_1$ is the number of turns of the primary winding and $I_g$ is the value of the exciting current for overcoming the effect of said linear reluctance, and means for connecting said secondary winding to a burden.

DESCRIPTION OF THE PREFERRED EMBODIMENTS

Figure 1:
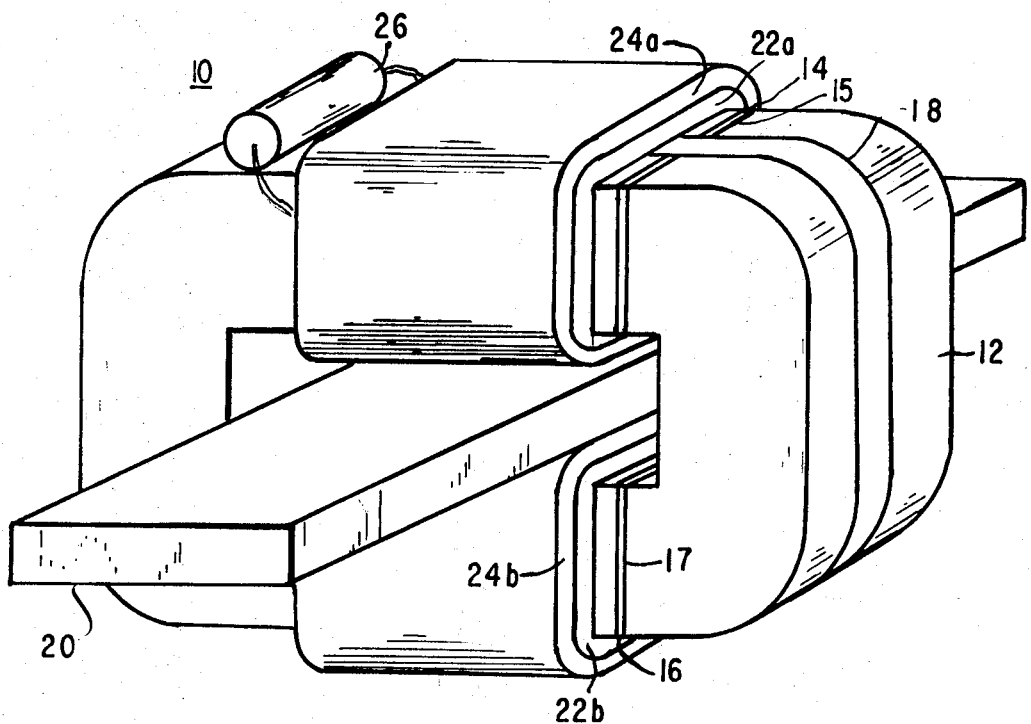
FIG. 1 is a view in perspective of one embodiment of the current transformer of the invention.

With reference to FIG. 1, an embodiment of the novel current transformer 10 shown thereat is identified as a 200:5 ampere current transformer capable of meeting 0.3 accuracy classification at a standard burden of 0.2 ohm, as defined in USAS C57.13, for any value of direct current component from zero to 100 amperes.

As there shown, the current transformer 10 comprises a magnetic core 12 which is wound of 12 mil, M-5 grain-oriented silicon steel, cemented together and cut to provide two gaps 14, 16 in the magnetic circuit. The effective core length in the desired embodiment is approximately 30 centimeters. Core 12 is assembled with two spacers 15, 17, each 0.0077 cm. thick, of high resistance material, to provide the equivalent of an air gap 0.0154 cm. in length. (The term "air gap" is used herein to identify a gap in the magnetic circuit which may be filled, for constructional reasons, with any high resistance material having unity permeability.) A core of such configuration is commercially available in a variety of forms and sizes, and in accordance with conventional C-core construction is banded with a non-magnetic strap 18 to insure maintenance of an accurately-held gap length.

A primary winding 20 consisting of a single turn of copper capable of continuously carrying 400 amperes may be comprised of a copper bar which extends transversely through the central opening of the core 10 and which in one embodiment was approximately ¼" thick and 1¾" in width. A secondary winding 22 consisting of 40 turns of #11 copper wire is divided into two sections one of which sections 22a is wound about the upper leg of the core 12 and the other of which sections 22b is wound about the lower leg of core 12. Conductor 25 (FIG. 2) connects the two sections 22a, 22b in series with output terminals 27, 28. Suitable "turns compensation" may be added to the secondary winding 22a, 22b as required in the manner well known in the art.

A third winding 24 consisting of 1000 turns of #27 copper wire is similarly divided into two sections 24a, 24b, one section 24a being wound over section 22a of the secondary winding 22 on the upper leg of core 12 and the second 24b being wound over the section 22b of the secondary winding 22 on the lower leg of core 12. Conductors 29, 30 (FIG. 2) connect the two sections 24a, 24b in series with a capacitor 26 of approximately 0.72 microfarad capacity. The entire transformer 10 is encapsulated in a suitable insulating material; the capacitor 26 may, optionally, be left accessible for "trimming" or replacement. As will be shown, the intended use of the transformer, or more accurately the burden on the transformer secondary winding 22a, 22b, determines the flux density required and therefore the size of the core 12. The air gap 14, 16 for such structure is determined by the amount of reluctance required to limit the saturating effect of the direct current component in the primary current. The ampere turns required for the structure and the magnetomotive force developed by the compensating winding will therefore vary in transformers used for different line currents and burdens.

According to the invention, the desired relationship can be achieved for current transformers by providing a primary winding having a number of turns $N_1$, an exciting current $I_g$ for the transformer air gap, a compensating winding having a number of turns $N_c$ and a capacitor C connected in series with the compensating winding which produces a capacitor current $I_c$, the ampere turns produced by the primary winding $N_1$ and the exciting current $I_g$ being equal to the ampere turns provided by the compensating winding $N_c$ and the capacitor current $I_c$ (i.e., $N_c I_c = N_1 I_g$).

With specific reference to the embodiment shown in FIG. 1, with a direct current magnetic bias of about 8 kilogauss (flux density) the transformer 10 having the described parameters will not exceed the specified accuracy limits; this corresponds to a magnetizing force of 0.13 oersted in the core 12. As the effective core length is about 30 centimeters, the magnetomotive force required to produce flux density of this order in the core 12 is 3.9 gilberts. The flux density, and hence the magnetizing force, in the air gap 14, 16 is 8000 gauss (or oersteds) and the total gap length is 0.0154 centimeter; hence the magnetomotive force required to maintain this flux in the air gaps is 123.2 gilberts. The total magnetomotive force required is the total of force required to produce the flux density in the core 12 and the flux in the air gaps 14, 16 or 127.1 gilberts, which is provided by a structure having approximately 100 ampere turns. Such construction is adequate to permit the current transformer 10 to operate accurately with a direct current component of 100 amperes in the primary winding.

The compensation required for the effect of the air gaps 14, 16 on the alternating current excitation may be calculated by assuming a maximum flux density due to alternating current alone, such as for example, 1 kilogauss. For such flux density a magnetomotive force of 8.65 ampere-turns (RMS value) is required for the air gaps 14, 16. At a frequency of 60 hertz and a core area of approximately 12 square centimeters, a flux density of such order will induce 32 volts in the 1000 turn winding 24 and will produce a current of 0.0087 ampere through the capacitor 26. This results in a magnetomotive force of 8.7 ampere-turns which is very slightly more than required to cancel the reluctance drop across the air gaps 14, 16. It will be noted that a flux density of different values may be assumed (i.e., for different line currents or burdens) and the relationship will be the same since both the required ampere-turns and the magnetomotive force developed by the compensating winding vary directly with the flux density.

A current transformer 10 constructed substantially as described will meet 0.3 accuracy classification at B 0.2 (as defined in USAS C57.13 1968 Sec. 4.3, page 14) for primary currents containing up to 100 ampere direct current component. In contrast, a conventional current transformer of the same rating would show an error in the order of 50% if subjected to direct current of this magnitude.

Figure 2:
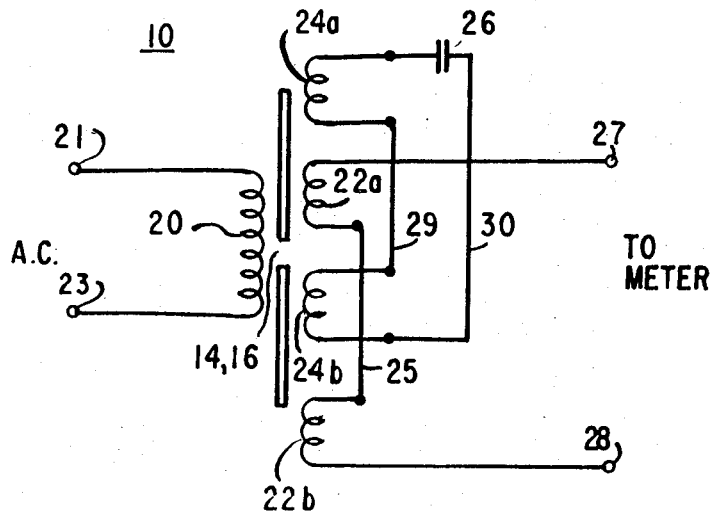
FIG. 2 is a schematic circuit diagram of the novel current transformer.

The schematic diagram shown in FIG. 2 illustrates the circuit connections of the transformer 10. As there shown, a pair of input terminals 21, 23 are provided to connect the primary winding 20 of the transformer 10 in a conventional alternating current circuit (not shown). The two sections 22a, 22b of secondary winding 22 are connected in series by conductor 25 and the end terminals of the two sections are connected via output terminals 27, 28 to the burden, which may be a watthour meter (not shown). The two sections 24a, 24b of the compensating winding 24 are connected in series with capacitor 26 by conductors 29, 30. Core 12 is shown to have air gaps 14, 16 and compensating winding 24 is shown to be wound in closely coupled relation to primary winding 20 so as to provide a magnetomotive force with capacitor 26 which is of a magnitude to overcome, and a direction to oppose, the effect of the air gaps 14, 16 as is now described.

Figure 3:
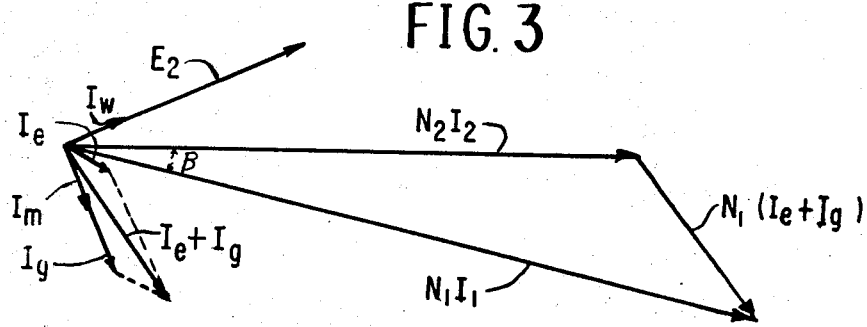
FIG. 3 is a phasor diagram for a current transformer having conventional primary and secondary windings of $N_1$, $N_2$ turns respectively, but having an appreciable air gap in the magnetic circuit.

With reference now to FIG. 3, there is shown thereat a phasor diagram representing the relations within a current transformer having a primary winding of $N_1$ turns and a secondary winding of $N_2$ turns and an air gap in the magnetic core. Since the burden on a current transformer is normally somewhat inductive, the phasor $N_2I_2$ representing the ampere turns of the secondary winding is shown lagging behind the induced voltage $E_2$. The exciting current $I_e$, which is exaggerated for purposes of illustration, has a loss component $I_w$, in phase with induced voltage $E_2$, and a magnetizing component $I_m$, in quadrature with induced voltage $E_2$.

The additional magnetizing current $I_g$ which is provided to overcome the reluctance of the air gap is also in quadrature with voltage $E_2$ since there is no loss associated with the air gap flux. The primary current is therefore such that the primary ampere-turns $N_1I_1$ must equal the vector sum of $N_2I_2$, $N_1I_e$ and $N_1I_g$. Since the phasor for $N_1I_1$ is somewhat longer than that of $N_2I_2$, the current transformer has a ratio error; and since $N_1I_1$ lags slightly behind $N_2I_2$, it also has a phase angle error $\beta$. Both the ratio error and phase angle error $\beta$ of the transformer are noticeably larger when an air gap is provided in the core than is the case when an air gap is not used. However, such an air gap, as noted above, is necessary to the present arrangement for the purpose of limiting the saturating effect of any direct current components.

Figure 4:
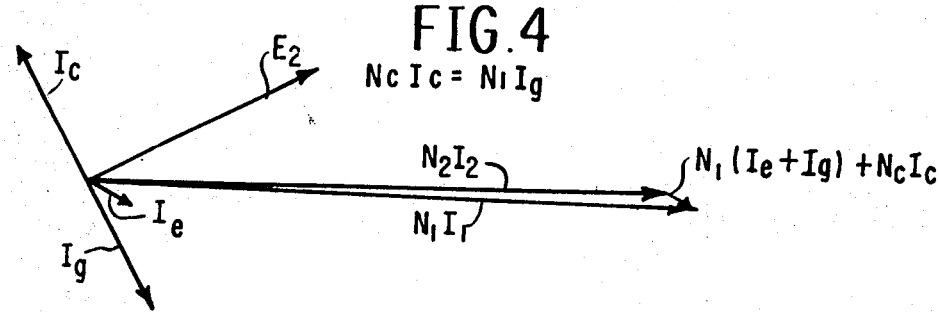
FIGS. 4 and 5 are phasor diagrams for a first and second embodiment of the novel current transformer of FIGS. 1 and 2.

The phasor diagram for the current transformer of the invention which includes a compensating winding 24 of $N_c$ turns on core 12 and a capacitor 26 in series therewith is shown in FIG. 4. With the resistance of winding 24 low compared to the impedance of the capacitor 26 at the fundamental frequency, the compensating current $I_c$, shown referred to the primary winding in FIG. 4, will be substantially in quadrature with $E_2$ but will lead it by approximately 90°. If, furthermore, the turns $N_c$ of winding 24 and the capacity of the capacitor 26 are so selected (or adjusted) that the magnetomotive force thereby applied to the core 12 is equal in magnitude to the magnetomotive force $N_1I_g$, required to overcome the effect of the air gap, the effect of the air gap is cancelled, since these magnetomotive forces are equal but opposite in direction. Since the magnetomotive force required to overcome the reluctance drop of the air gaps is directly proportional to the flux density and $I_c$ (and hence the magnetomotive force produced by it) is also directly proportional to the flux density, this compensation is completely effective regardless of variation of line current or of burden. With the effect of the air gaps 14, 16 compensated in this manner, the primary winding 20 ($N_1$) needs only to supply the magnetomotive force required to excite the core 12 itself, and the end result, as regards accuracy, is as if the air gap had not been included.

Figure 5:
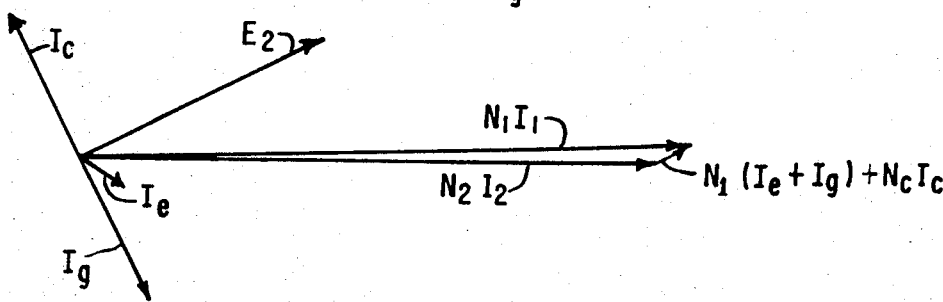

In certain embodiments it may be desirable to slightly over-compensate the air gap reluctance in the manner indicated in FIG. 5, where $I_c$, again shown referred to the primary winding, is slightly greater than $I_g$, thereby further reducing the overall errors of the current transformer.

We claim:
1. A current transformer comprising a magnetic core with a primary winding wound thereon for connection in a power circuit and a secondary winding wound thereon for connection to a burden, said core including a linear reluctance which constitutes the major portion of the total core reluctance, a compensating winding and a capacitor connected across said compensating winding, said primary winding and compensating winding having a number of turns and said capacitor being of a value to provide the relationship $N_cI_c=N_1I_g$ in which $N_c$ is the number of turns on the compensating winding, $I_c$ is the capacitor current, $N_1$ is the number of turns of the primary winding and $I_g$ is the value of the exciting current for overcoming the effect of said linear reluctance.

2. A current transformer as set forth in claim 1 in which said linear reluctance comprises an air gap in said core.

3. A current transformer as set forth in claim 1 in which the resistance of said compensating winding is low compared to the impedance of said capacitor at the fundamental frequency, and said current $I_c$ is in quadrature with the voltage E induced in said secondary winding.

4. A current transformer as set forth in claim 1 in which said core is comprised of a C shaped structure, and said secondary winding and said compensating winding comprise two sections, one section of said secondary winding and one section of said compensating winding being wound on one leg of said C shaped structure, and the second section of said secondary winding and said compensating winding being wound on the other leg.

5. A current transformer as set forth in claim 1 in which $N_cI_c$ is made slightly greater than $N_1I_g$ to overcompensate for the air gap reluctance.

References Cited
UNITED STATES PATENTS

| | | | |
|---|---|---|---|
| 1,932,051 | 10/1933 | Steinert | 324—127X |
| 2,994,039 | 7/1961 | Parke | 324—127X |
| 3,389,329 | 6/1968 | Quirk et al. | 323—48X |

J D MILLER, Primary Examiner

G. GOLDBERG, Assistant Examiner

U.S. Cl. X.R.

323—48, 60; 324—127; 336—175, 178, 184